(12) United States Patent
Sato et al.

(10) Patent No.: US 7,284,443 B2
(45) Date of Patent: Oct. 23, 2007

(54) SEMICONDUCTOR PRESSURE SENSOR AND PROCESS FOR FABRICATING THE SAME

(75) Inventors: Masakazu Sato, Sakura (JP); Tatsuya Ito, Tokyo (JP); Hideto Noguchi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/543,493

(22) PCT Filed: Jan. 29, 2004

(86) PCT No.: PCT/JP2004/000810

§ 371 (c)(1),
(2), (4) Date: Jul. 27, 2005

(87) PCT Pub. No.: WO2004/068096

PCT Pub. Date: Aug. 12, 2004

(65) Prior Publication Data

US 2006/0185437 A1    Aug. 24, 2006

(30) Foreign Application Priority Data

Jan. 30, 2003    (JP)    ............................. 2003-021284

(51) Int. Cl.
*G01L 9/00*    (2006.01)
(52) U.S. Cl. .......................................... 73/754; 73/753
(58) Field of Classification Search .......... 73/700–756; 361/283.1–283.4
See application file for complete search history.

(56) References Cited

U.S. PATENT DOCUMENTS

| | | | | |
|---|---|---|---|---|
| 5,333,505 A | * | 8/1994 | Takahashi et al. | ............. 73/727 |
| 5,444,286 A | * | 8/1995 | Ichihashi | ..................... 257/420 |
| 5,859,759 A | * | 1/1999 | Moriyama et al. | ........ 361/283.4 |
| 5,986,316 A | * | 11/1999 | Toyoda et al. | ............... 257/419 |
| 6,401,542 B1 | * | 6/2002 | Kato | ........................... 73/721 |
| 2002/0029639 A1 | * | 3/2002 | Wagner et al. | ................. 73/756 |
| 2003/0207494 A1 | | 11/2003 | Suzuki et al. | |

FOREIGN PATENT DOCUMENTS

| | | |
|---|---|---|
| JP | H11-204678 A | 7/1999 |
| JP | H11-307694 A | 11/1999 |
| JP | 2000-58695 A | 2/2000 |
| JP | 2000-174078 A | 6/2000 |
| WO | WO 00/77844 A1 | 12/2000 |

* cited by examiner

*Primary Examiner*—Edward Lefkowitz
*Assistant Examiner*—Jermaine Jenkins
(74) *Attorney, Agent, or Firm*—Sughrue Mion Pllc.

(57) ABSTRACT

This invention aims to realize reduction in size without impairing measurement accuracy or connection reliability in a semiconductor pressure sensor in which a glass substrate is adhered to a rear-surface side of a pressure-sensitive chip in which piezoresistive pressure-sensitive gauges have been formed on a front surface of a diaphragm formed of a silicon single crystal to form a space between a rear surface of the diaphragm and the glass substrate, for measuring a pressure applied to the front surface of the diaphragm with reference to a pressure of the first space as a standard pressure. In order to achieve this object, the semiconductor pressure sensor includes resinous projections formed on pressure-sensitive gauge electrodes disposed on a front surface of the pressure-sensitive chip or on wiring from the pressure-sensitive gauge electrodes and bumps formed so as to partially or entirely cover the resinous projections.

3 Claims, 7 Drawing Sheets

SEMICONDUCTOR PRESSURE SENSOR AND PROCESS FOR FABRICATING THE SAME

This application claims priority from PCT Application No. PCT/JP2004/000810 filed 1/29/2004 and from Japanese Application No. 2003-021284 filed 1/30/2003, which applications are incorporated herein by reference.

TECHNICAL FIELD

The present invention relates to a semiconductor pressure sensor to be used for a measurement of atmospheric pressure or gas pressure or the like and a manufacturing method thereof, and in particular, it relates to a semiconductor pressure sensor for which a reduction in size has been realized by a connection via bumps and influence of stress acting on the bumps owing to a difference in thermal expansion between connected objects has been relieved to realize an improvement in connection and sensor reliability and a manufacturing method thereof.

BACKGROUND ART

A pressure-sensitive chip for a semiconductor pressure sensor is formed of a silicon single crystal similar to in an integrated circuit (IC) component, and is provided with, at a center portion of this chip, a diaphragm formed by thinning the thickness of the chip. And, on the surface of this diaphragm, piezoresistive pressure-sensitive gauges (semiconductor strain gauges) are formed. When pressure is applied to the diaphragm, the diaphragm is deformed to change the pressure-sensitive gauges in electric resistance, and this change in electric resistance is detected as an electric signal, whereby a pressure or a change in pressure is measured. Semiconductor pressure sensors include relative pressure-type semiconductor pressure sensors for measuring relative pressures and absolute pressure-type semiconductor pressure sensors for measuring absolute pressures.

A sectional view of an absolute pressure-type semiconductor pressure sensor is shown in FIG. 10. By making a glass substrate 23 adhere to a rear-surface side of a pressure-sensitive chip 21, a vacuum space is formed between a diaphragm 20 and a glass substrate 23. A pressure applied to the front surface of the diaphragm 20 is measured as an absolute pressure with reference to a vacuum pressure of the rear-surface side as a standard. The drawing shows a condition where the diaphragm 20 has been warped owing to pressure applied to the front surface of the pressure-sensitive chip 21.

As a conventional absolute pressure-type semiconductor pressure sensor, one whose pressure-sensitive chip 21 has been protected by a case has been proposed (see Japanese Unexamined Patent Application, First Publication No. 2000-88687, for example). An example of this pressure sensor is shown in FIG. 11. A glass substrate 23 is attached to the pressure-sensitive chip 21 which is provided with piezoresistive pressure-sensitive gauges (unillustrated) formed on a silicon substrate, and a vacuum chamber 24 is formed therebetween. The pressure-sensitive chip 21 and glass substrate 23 are covered with a case 25, and the pressure-sensitive chip 21 is connected to leads 27 via bonding wires 26.

In such an absolute pressure-type semiconductor pressure sensor, due to presence of the case 25, damage to the bonding wires 26 and deterioration of the pressure-sensitive gauge electrodes are prevented. Connecting the pressure-sensitive gauge electrodes to an external electronic measuring device directly by soldering becomes a factor in fluctuation of sensor output since stress occurs owing to a difference in thermal expansion, and therefore, to connect them, the bonding wires 26 and leads 27 are used. As a result, with a structure having the case 25, bonding wires 26, and leads 27, reduction in size is difficult.

In order to realize reduction in size of an absolute pressure-type semiconductor pressure sensor, one whose pressure-sensitive chip and leads have been electrically connected by conductive bumps has been proposed (see Japanese Unexamined Patent Application, First Publication No. 2002-82009). An example of this pressure sensor is shown in FIG. 12. A bump 33 having conductivity is formed on one surface 32 of a pressure-sensitive chip 31, and the bump 33 and a lead 36 are electrically connected in a condition where the one surface 32 of the pressure-sensitive chip 31 and one surface 35 of the base 34 are opposed.

However, in this structure, since the pressure-sensitive chip 31 and lead 36 are firmly connected via the bump 33, when a change in temperature occurs, stress caused by a difference in thermal expansion between the pressure-sensitive chip 31 and an electronic measuring device occurs, and the stress easily concentrates on the bump 33. When strain of the bump 33 becomes great as a result of this stress concentration, there is a possibility that a problem such as electrode exfoliation and an increase in the resistance value occurs. In addition, as a result of occurrence of a fluctuation in the resistance value of a piezoresistive pressure-sensitive gauge owing to this stress, the sensor erroneously detects that a fluctuation in pressure has occurred. Accordingly, when reduction in size is attempted by a connection using bumps 33, it is necessary to provide the bumps 33 with some stress relieving function.

On the other hand, in recent years, with the reduction in size of semiconductor devices, a reduction in size of semiconductor packages has been realized. Of these, one for which reliability of a connecting portion has been improved and reduction in size has been realized by providing a resin post structure in a solder bump portion and a stress concentrated in the bump is relieved by this resin post has been proposed (see Japanese Unexamined Patent Application, First Publication No. 2002-280476, for example). An example of this semiconductor package is shown in FIG. 13. This has been provided by coating a resinous projection 44 provided on a insulating resin layer 43 of a wafer 41 with a conductive layer 45, and connection reliability has been improved and reduction in size of the semiconductor package has been realized by forming a post 46 constructed so as to disperse and absorb a stress by way of deformation of the resinous projection 44.

The present invention has been made in view of the above-described circumstances, and an object thereof is to provide a semiconductor pressure sensor for which reduction in size has been realized without impairing pressure measurement accuracy and connection reliability by connecting a pressure-sensitive chip to an electronic measuring device by use of bumps having a stress relieving function.

DISCLOSURE OF THE INVENTION

In order to achieve this object, a first aspect of the invention is a semiconductor pressure sensor in which a glass substrate is adhered to a rear-surface side of a pressure-sensitive chip in which piezoresistive pressure-sensitive gauges have been formed on a front surface of a diaphragm formed of a silicon single crystal to form a first space between a rear surface of the diaphragm and the glass substrate, for measuring a pressure applied to the front surface of the diaphragm with reference to a pressure of the first space as a standard pressure, wherein there are provided resinous projections formed on the pressure-sensitive gauge electrodes disposed on a front surface of the pressure-sensitive chip and bumps formed so as to partially or entirely cover these resinous projections.

In addition, a second aspect of the invention is a semiconductor pressure sensor in which a glass substrate is adhered to a rear-surface side of a pressure-sensitive chip in which piezoresistive pressure-sensitive gauges have been formed on a front surface of a diaphragm formed of a silicon single crystal to form a space between a rear surface of the diaphragm and the glass substrate, for measuring a pressure applied to this space with reference to a pressure applied to the front surface of the diaphragm as a standard pressure, wherein there are provided resinous projections formed the on pressure-sensitive gauge electrodes disposed on a front surface of the pressure-sensitive chip and bumps formed so as to partially or entirely cover these resinous projections.

In addition, according to a third aspect of the invention, in the above-mentioned first or second aspect of the invention, the bumps are formed so as to cover a conductive layer which covers the resinous projections, and the pressure-sensitive chip is electrically connected to an electronic measuring device via the bumps and the conductive layer.

In addition, a fourth aspect of the invention is a manufacturing method for a semiconductor pressure sensor wherein, by forming a resin layer on a pressure-sensitive chip, forming opening portions which show ring forms or letter C forms in a plan view by partially removing the resin layer which covers pressure-sensitive gauge electrodes, and removing at least the resin layer which covers piezoresistive pressure-sensitive gauges, resinous projections in shapes protruding on the pressure-sensitive gauge electrodes and an insulating resin layer to cover a part excluding the piezoresistive pressure-sensitive gauges on the pressure-sensitive chip around these opening portions are formed, and then, a conductive layer to partially or entirely cover the resinous projections is formed so as to connect so that electric conduction is possible with the pressure-sensitive gauge electrodes, and bumps are formed so as to cover this conductive layer.

BEST MODE FOR CARRYING OUT THE INVENTION

Hereinafter, an embodiment of a semiconductor pressure sensor according to the present invention will be described in detail with reference to the attached drawings.

Figure 1:
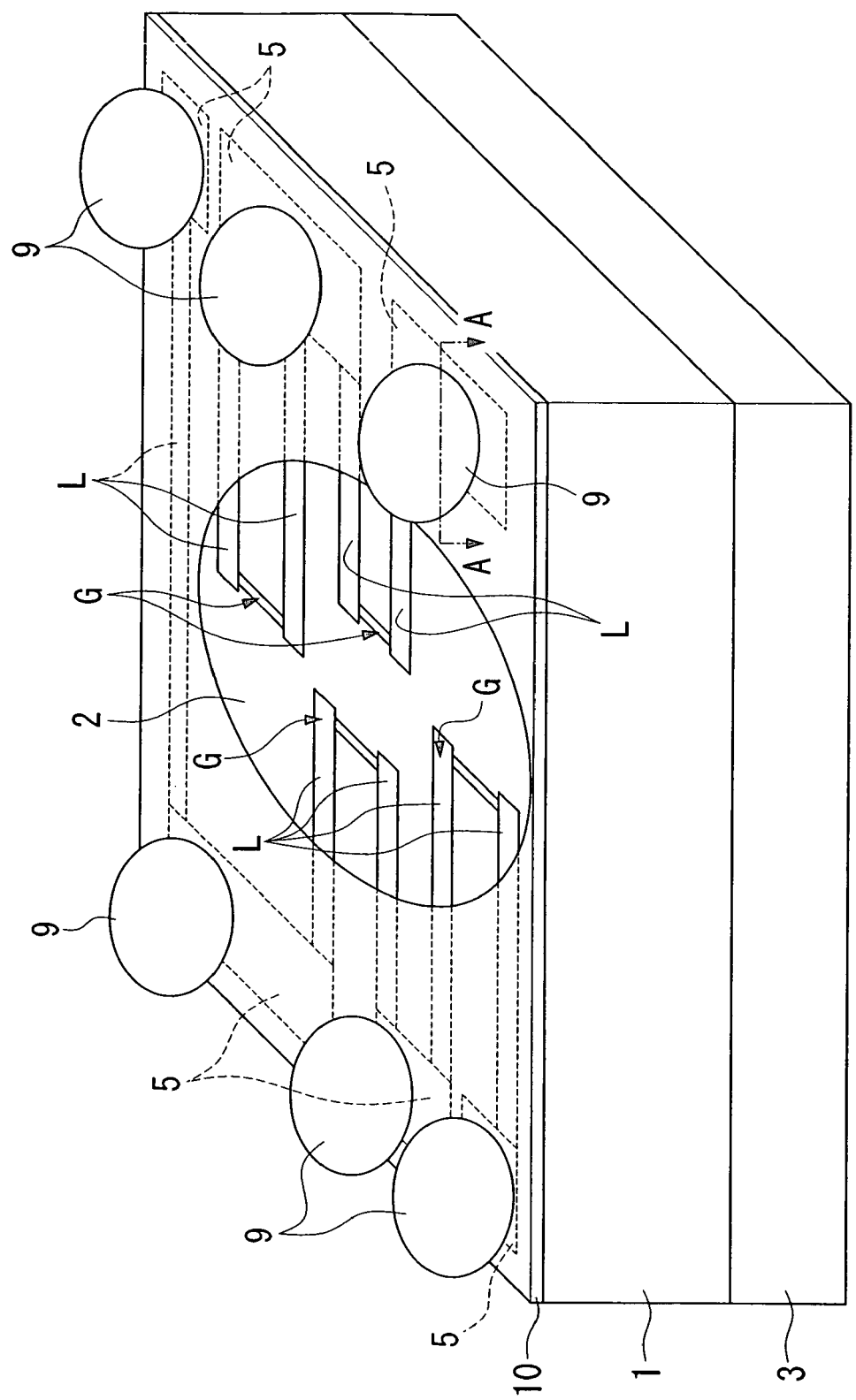
FIG. 1 is an upper perspective view showing a structural example of a semiconductor pressure sensor according to the present invention.
Figure 2:
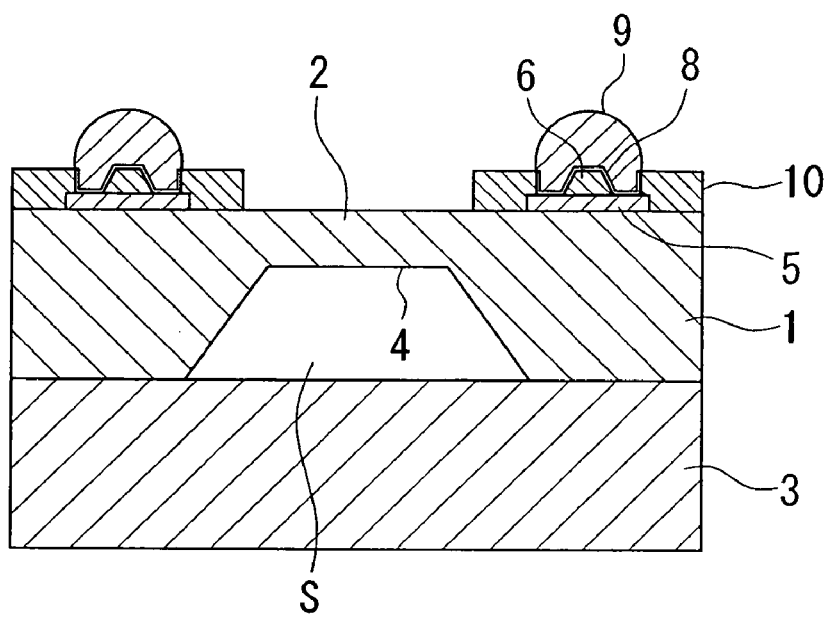
FIG. 2 is a sectional view showing a structural example of an absolute pressure-type semiconductor pressure sensor according to the present invention.
Figure 3:
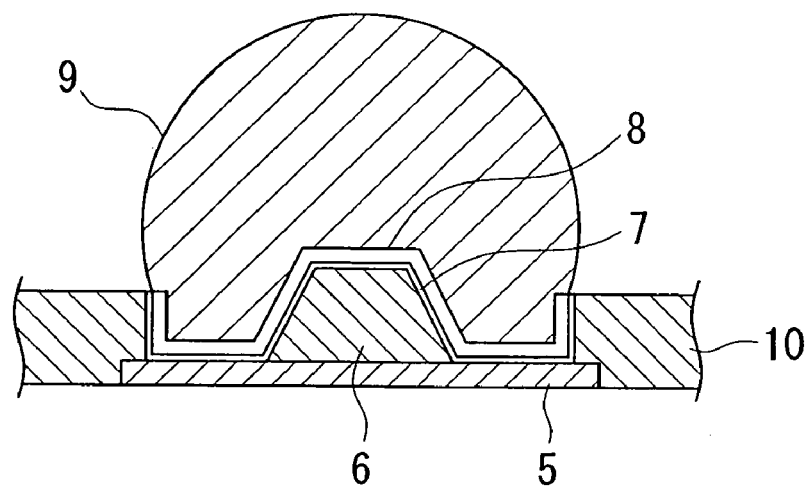
FIG. 3 is an enlarged view showing a section of a pressure-sensitive gauge electrode portion of FIG. 2.

FIG. 1 is an upper perspective view showing a structural example of a semiconductor pressure sensor according to the present invention, FIG. 2 is a sectional view of a semiconductor pressure sensor of an absolute pressure type according to the present invention, and FIG. 3 is an enlarged view (a sectional view along a line A-A in FIG. 1) of a pressure-sensitive gauge electrode portion of the semiconductor pressure sensor shown in FIG. 2.

In these drawings, reference numeral 1 denotes a pressure-sensitive chip. The pressure-sensitive chip 1 is formed of a silicon single crystal having a thickness of approximately 200 to 300 µm, and a center portion of the pressure-sensitive chip 1 is thinned to approximately 20 to 50 µm by etching or the like applied from the rear surface. In addition, this thin part shows a circular form in a plan view. On the front surface of this thin part, four piezoresistive pressure-sensitive gauges G and piezoresistive pressure-sensitive leads L (see FIG. 1) are formed in a dispersed manner. Pressure-sensitive gauge electrodes 5 are formed at outer peripheries of the pressure-sensitive chip 1, and the pressure-sensitive gauge electrodes 5 and piezoresistive pressure-sensitive gauges G are connected by the piezoresistive pressure-sensitive leads L extending from end portions of the respective piezoresistive pressure-sensitive gauges G to the outer peripheries of the pressure-sensitive chip 1. Thereby, a Wheatstone bridge circuit is formed. On the rear-surface side of the pressure-sensitive chip 1, a concave portion 4 is formed by thinning the center portion of the pressure-sensitive chip 1, and by anode bonding between outer peripheries of a bottom portion of the pressure-sensitive chip 1 and a glass substrate 3 in a vacuum chamber, a pressure sensor whose reference pressure is of the inside of a space (first space) sandwiched between the concave portion 4 and glass substrate 3 and maintained in a vacuum state is obtained. In addition, when an external pressure is applied to the thin part (diaphragm 2) of the pressure-sensitive chip 1, the diaphragm 2 is deformed, and the individual gauge resistors formed on the front surface of the diaphragm 2 are changed. A fluctuation in sensor output is monitored by use of this change in resistors in the Wheatstone bridge circuit, and this is converted into a pressure.

The front surface of the pressure-sensitive chip 1 is covered with an insulating resin layer 10 having opening portions on the pressure-sensitive gauge electrodes 5 and on the diaphragm 2, and at a part of the pressure-sensitive gauge electrode 5, a resinous projection 6 is formed. The resinous projection 6 forms a post P by being partially or entirely coated with a seed layer 7 and a conductive layer 8, and a bump 9 is formed so as to cover this post P. The bump 9 is connected via the seed layer 7 and conductive layer 8 so that electric conduction is possible with the pressure-sensitive gauge electrode 5, and consequently, when the bump 9 is connected to an electronic measuring device (unillustrated), the electronic measuring device and pressure-sensitive gauge electrode 5 are connected via the bump 9 so that electric conduction is possible. As the pressure-sensitive gauge electrodes 5, although various types of conductive materials can be employed, aluminum is herein employed. Here, for the numbers, shapes, and attaching positions of the piezoresistive pressure-sensitive gauges G, pressure-sensitive gauge electrodes 5, and piezoresistive pressure-sensitive leads L, various modes can be employed, and these are therefore not particularly limited.

The resinous projection 6 is raised above the pressure-sensitive gauge electrode 5 and is in a semicircular form whose section is trapezoidal or having a flat portion at the top.

The resinous projection 6 is, for example, made of polyimide, an epoxy resin, a silicone resin or the like, the thickness is, for example, 25 to 100 µm, and it can be formed by a spin-coating method, a printing method, a lamination method or the like.

In addition, in consideration of stress which acts on the resinous projection 6 when the device is used as a pressure sensor, it is desirable that hardness of the resin composing the resinous projection 6 is a Young's modulus (elasticity) of 5 Gpa or less. In addition, it is desirable that the individual resinous projections 6 around the diaphragm 2 are, when the device is used as a pressure sensors, in order to prevent unevenness in stresses to act on these resinous projections 6, disposed at positions symmetrical with respect to the diaphragm 2 as a center in a plan view.

The film-like seed layer 7 coated on the resinous projection 6 is, as shown in FIG. 3, formed on the pressure-sensitive gauge electrodes 5 exposed around the resinous projection 6 as well, and is connected to the pressure-sensitive gauge electrode 5 so that electric conduction is possible. In addition, on the seed layer 7, a film-like conductive layer 8 is formed by coating.

The seed layer 7 functions as a power feeding layer and a UBM (under bump metal) in an electrolytic plating (hereinafter, abbreviated to "plating") step for the conductive layer 8. The function as a UBM is a function such as to secure adhesion between the conductive layer 8 and resinous projection 6 and as a barrier to prevent metal diffusion between the pressure-sensitive gauge electrode 5 and conductive layer 8. As the seed layer 7, for example, a metal or alloy of Cr, Cu, Ni, Ti, W, Ta, Mg, Au or the like can be employed, however, there is no limitation to a construction made of a single metal layer, and a construction of a plurality of laminated metal layers can also be employed. In the present embodiment, employed is a double layer structure of a Cr layer having a thickness of approximately 40 nm to cover the pressure-sensitive gauge electrode 5 exposed around the bottom portion of the resinous projection 6 and front surface of the resinous projection 6 and a Cu layer having a thickness of approximately 100 to 150 nm to cover this Cr layer which have been formed as a laminated structure by a sputtering method.

As the conductive layer 8, employed is a plating layer plated with a metal or alloy such as Cu or Ni. However, this conductive layer 8, is not limited to a construction composed only of a single metal layer (including an alloy layer, the same applies in the following), and for example, a construction of a plurality of laminated metal layers can also be employed. In the present embodiment, employed is a triple layer structure composed of a copper plating layer having a thickness of approximately 3 to 20 µm to cover the seed layer 7, a Ni plating layer having a thickness of approximately 1 to 10 µm to cover this copper plating layer, and furthermore, an Au plating layer having a thickness of approximately 0.1 to 1.0 µm to cover this Ni plating layer.

Figure 4:
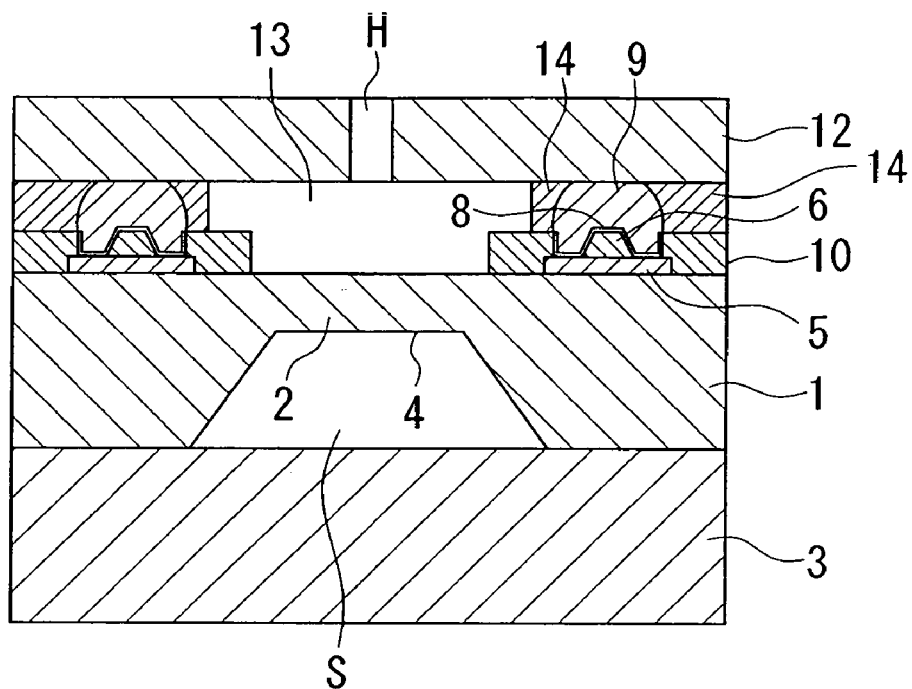
FIG. 4 is a sectional view showing a situation where the semiconductor pressure sensor of FIG. 2 has been mounted on an electronic measuring device via bumps.

This absolute pressure-type semiconductor pressure sensor is, as shown in FIG. 4, mounted on the electronic measuring device (circuit substrate 12) via the bumps 9. In addition, a space (second space) 13 sandwiched between the front surface of the diaphragm 2 and circuit board 12 is communicated with a space (unillustrated) to be a target of pressure measurement via a hole H formed in the circuit board 12, and the surroundings of the space 13 are shielded by sealing the surroundings of the pressure-sensitive chip 1 with a filler 14. Pressure which is applied to the front surface of the diaphragm 2 via the hole H and space 13 is measured as an absolute pressure with reference to a vacuum pressure in the space S as a reference.

According to this absolute pressure-type semiconductor pressure sensor, since the bumps 9 are formed so as to cover the resinous projections 6, stress caused by a difference in thermal expansion between the pressure-sensitive chip 1 and electronic measuring device can be absorbed by deformation of the resinous projections 6. As a result, a connected condition between the bumps 9 and electronic measuring device can be stably maintained, and inconvenience such as electrode exfoliation can be reliably prevented. Furthermore, an influence of stress on the sensor can also be suppressed. In addition, since a contact area between the bumps 9 and resinous projections 6 is sufficiently secured, it becomes possible to securely transmit stress acting on the bumps 9 to the resinous projections 6, and a fixing force transmitted from the bumps 9 to the pressure-sensitive chip 1 side via the resinous projections 6 is improved, whereby exfoliation of the bumps 9 as a result of a stress action and the like can be prevented.

Next, an example of a manufacturing method for the above-described absolute pressure-type semiconductor pressure sensor will be described. FIG. 5 to FIG. 9 are process drawings showing a manufacturing method for the absolute pressure-type semiconductor pressure sensor shown in FIG. 2. Here, in the present manufacturing method, although pressure-sensitive chips 1 are usually formed in a wafer form, individual chips will be described.

First, prepared is a pressure-sensitive chip 1 in which a diaphragm 2 has been formed, on the front surface thereof, piezoresistive pressure-sensitive gauges G and piezoresistive pressure-sensitive leads L have been formed in a dispersed manner, and pressure-sensitive gauge electrodes 5 are formed around the diaphragm 2, and an insulating resin layer 10 is formed on this pressure-sensitive chip 1. The insulating resin layer 10 is formed, by spin-coating a liquid photosensitive resin such as photosensitive polyimide, so as to cover the piezoresistive pressure-sensitive gauges G and pressure-sensitive gauge electrodes 5 at a thickness of approximately 5 to 10 µm.

Figure 5:
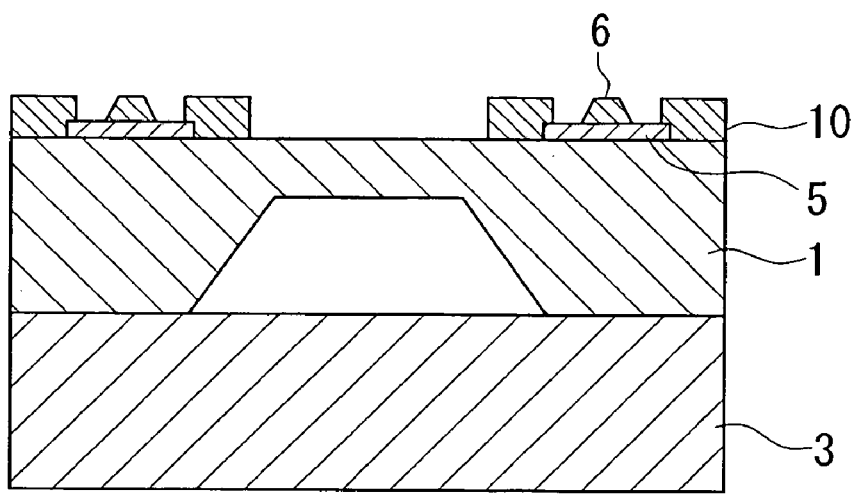
FIG. 5 is a view showing a step of a manufacturing method for the semiconductor pressure sensor of FIG. 2, which shows a condition where opening portions have been provided in an insulating resin layer.

Next, as shown in FIG. 5, by a photolithographic technique, a part of the insulating resin layer 10 positioned on the pressure-sensitive gauge electrode 5 is removed to form an opening portion which shows a ring form in a plan view on the pressure-sensitive gauge electrode 5. Thereby, an insulating resin layer 10 having an opening portion is formed on the pressure-sensitive gauge electrode 5, and a resinous projection 6 is formed in the opening portion. In addition, simultaneously therewith, an unnecessary portion of the insulating resin layer 10 on the diaphragm is removed. At this time, part of the insulating resin layer 10 is removed so that an edge portion of the pressure-sensitive gauge electrode 5 is covered with the insulating resin layer 10 and the pressure-sensitive gauge electrode 5 is exposed around the resinous projection 6, and the insulating resin layer 10 is also partially removed so that the individual resinous projections 6 around the diaphragm 2 are arranged at positions symmetrical with respect to the diaphragm 2 as a center in a plan view.

Here, a planar shape of the opening portion is not always limited to a ring form. For example, by connecting a part of the resinous projection 6 surrounded by the opening portion to the surrounding insulating resin layer 10, an opening portion where the above-described planar shape shows a letter C form may be formed.

By this technique, since the insulating resin layer 10 and resinous projections 6 can be simultaneously formed, reduction of forming time and reduction in the number of forming steps can be realized. In addition, in this step, the resinous projections 6 can be formed into desirable shapes and dimensions in response to the shapes of the bumps 9 to be formed in a later step, and in accordance with the shape of the diaphragm 2, the individual resinous projections 6 can be formed at desirable positions.

The insulating resin layer 10 can also be formed by bonding a sheet or film formed of a photosensitive resin such as a photosensitive polyimide. In this case as well, by forming opening portions by partially removing the insulating resin layer 10 positioned on the pressure-sensitive gauge electrodes 5 by a photolithographic technique to create ring forms, the insulating resin layer 10 and resinous projection 6 can be simultaneously formed in a short time.

Next, after forming the insulating resin layer 10 and resinous projections 6, a seed layer 7 is formed. Specifically, in the opening portions of the insulating resin layer 10, after forming a Cr layer having a thickness of approximately 40 nm by a sputtering method on the pressure-sensitive gauge electrode 5 exposed around the resinous projection 6 and front surface of the resinous projection 6, a Cu layer having a thickness of approximately 100 to 500 nm to cover this Cr layer is formed by a sputtering method. This seed layer 7 is formed across the entire surface of the chip.

The Cr layer is excellent in adhesion to the pressure-sensitive gauge electrode 5, resinous projection 6, and insulating resin layer 10. Also, since the Cu layer functions as a power feeding layer in a plating step for a conductive layer 8 to be described later and is also excellent in adhesion to the conductive layer 8, it functions for adhesion between the seed layer 7 and conductive layer 8.

Here, the respective metal layers composing the seed layer 7 (the aforementioned Cr layer and Cu layer) can be formed not only by the sputtering method but also by an evaporation method or the like. In addition, it is also possible to coat the resinous projection 6 directly with a metal layer (herein, a Cr layer) by a nonelectrolytic plating method.

Figure 6:
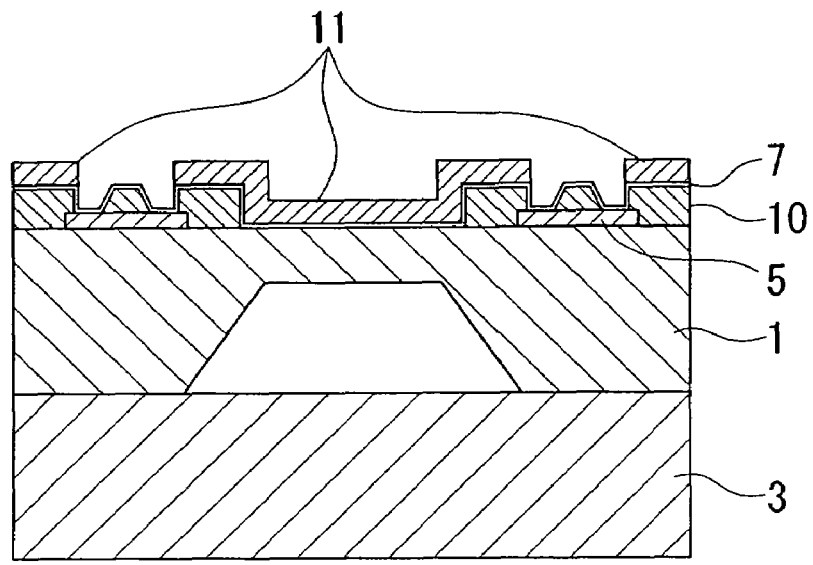
FIG. 6 is a view showing a step of a manufacturing method for the semiconductor pressure sensor of FIG. 2, which shows a condition where conductive-layer forming portions have been opened after resist coating.

After forming the seed layer 7, by a plating method, the conductive layer 8 is formed so as to cover the seed layer 7. In a plating step for this conductive layer 8, first, as shown in FIG. 6, on the pressure-sensitive chip 1 on which the insulating resin layer 10 and resinous projections 6 have been formed, by forming a resist 11 so as to have openings at parts corresponding to regions where the conductive layer 8 is to be formed (herein, regions including the opening portions on the pressure-sensitive gauge electrodes 5 and resinous projections 6 inside the same), regions where no conduction layer 8 is to be formed are covered to expose only the regions where the conductive layer 8 is to be formed. When forming the resist 11, for example, after forming a resin layer on the pressure-sensitive chip 1 on which the insulating resin layer 10 and resinous projections 6 have been formed by spin-coating a liquid photosensitive resin for a resist, the resin layer at parts corresponding to the regions where the conductive layer 8 is to be formed is removed by a photolithographic technique.

Figure 7:
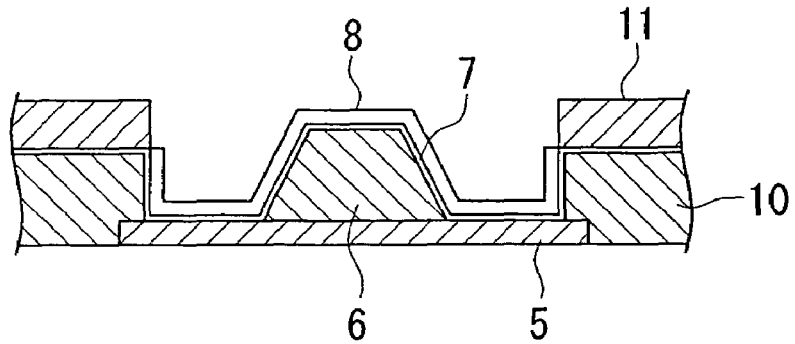
FIG. 7 is a view showing a step of a manufacturing method for the semiconductor pressure sensor of FIG. 2, which is an enlarged view showing a condition where a conductive layer has been formed.

After forming the resist 11, as shown in FIG. 7, at the opening portions of the resist 11, a conductive layer 8 is formed by plating. Specifically, after forming a copper plating layer having a thickness of approximately 3 to 20 µm to cover the seed layer 7, by forming a Ni plating layer having a thickness of approximately 1 to 10 µm to cover this copper plating layer, and furthermore, by forming an Au plating layer having a thickness of approximately 0.1 to 1.0 µm to cover this Ni plating layer, a conductive layer 8 of a triple layer structure is formed.

Here, formation of the resist 11 having opening portions corresponding to regions to form a conductive layer 8 is not limited to removal of a photosensitive resin layer by a photolithographic technique. For example, it is also possible to employ a technique for forming opening portions for conductive layer 8 plating by laminating a dry-film-like resist on a pressure-sensitive chip and removing parts corresponding to regions to form the above-described conductive layer 8 by laser processing, plasma etching, wet etching or the like.

After formation of the conductive layer 8 has been completed, the resist 11 is exfoliated, and an unnecessary portion of the seed layer 7 (such as a portion of the seed layer 7 on the insulating resin layer 10 and on the diaphragm 2) is removed by etching or the like. Thereafter, on the front surface of the conductive layer 8, bumps 9 made of, for example, solder are formed. As a forming method for the bumps 9, a printing method, a method using metal jet, or a method for placing solder balls on a flux can be mentioned. By these bumps 9, the opening portions on the pressure-sensitive gauge electrodes 5 of the insulating resin layer 10 are sealed.

Thereby, an absolute pressure-type semiconductor pressure sensor with the bumps 9 having a stress relieving function as shown in FIG. 3 is formed.

Here, the present invention is not limited to the above embodiment, and various modifications can be made. For example, the present invention can also be applied to a relative pressure-type semiconductor pressure sensor.

Figure 8:
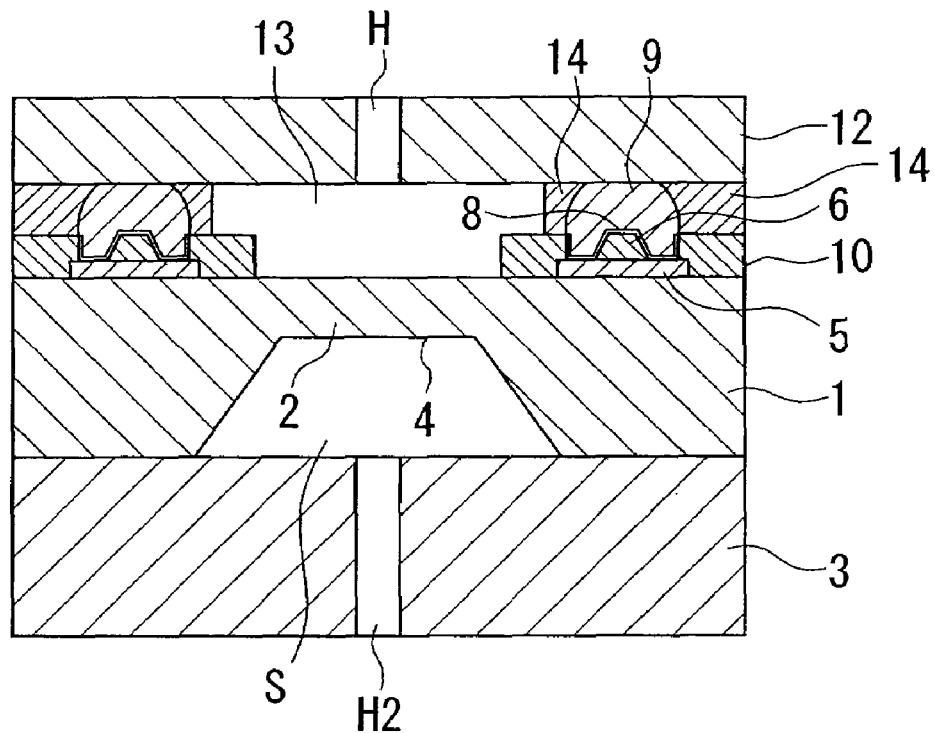
FIG. 8 is a sectional view showing a situation where a relative pressure-type semiconductor pressure sensor according to the present invention has been mounted on an electronic measuring device via bumps.

FIG. 8 shows a situation where a relative pressure-type semiconductor pressure sensor according to the present invention has been mounted on an electronic measuring device (circuit board 12) via bumps 9. In this relative pressure-type semiconductor pressure sensor, a space S sandwiched between a concave portion 4 of a semiconductor chip 1 and a glass substrate 3 is communicated, via a hole H2 formed in the glass substrate 3, to a space (unillustrated) to be a target of pressure measurement. In addition, the circuit board 12 has a hole H to communicate with atmospheric air, and as a result, air pressure of a space 13 sandwiched between the front surface of a diaphragm 2 and circuit board 12 is equal to atmospheric pressure. Then, pressure applied to the rear surface of the diaphragm 2 via the hole H2 and space S is measured as a relative pressure with reference to the air pressure (atmospheric pressure) of the above-described space 13 as a standard. Other aspects of construction to form a pressure sensor, a manufacturing method thereof, and operations and effects are the same as those of the embodiment shown in FIG. 1 through FIG. 7 mentioned above.

Figure 9:
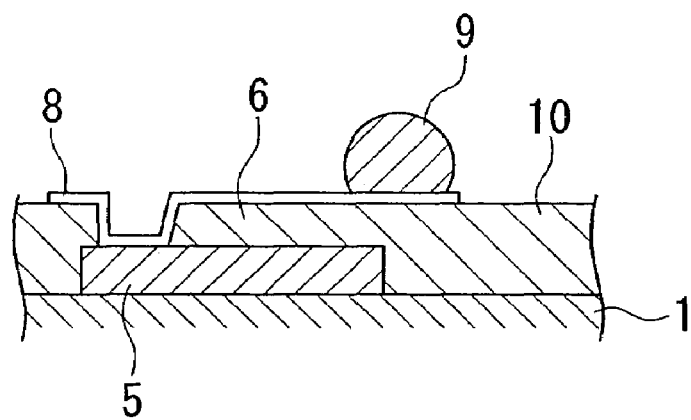
FIG. 9 is a sectional view showing a structural example of an absolute pressure-type semiconductor pressure sensor according to the present invention.
Figure 10:
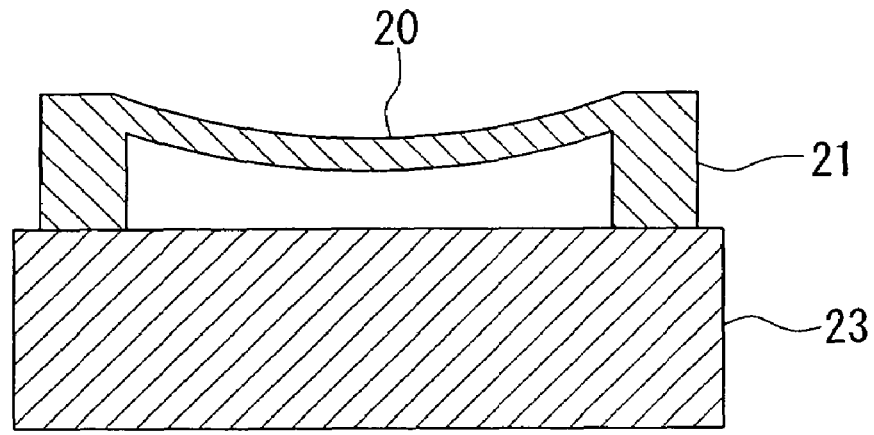
FIG. 10 is a sectional view showing an example of a pressure-sensitive chip in a conventional absolute pressure-type semiconductor pressure sensor.
Figure 11:
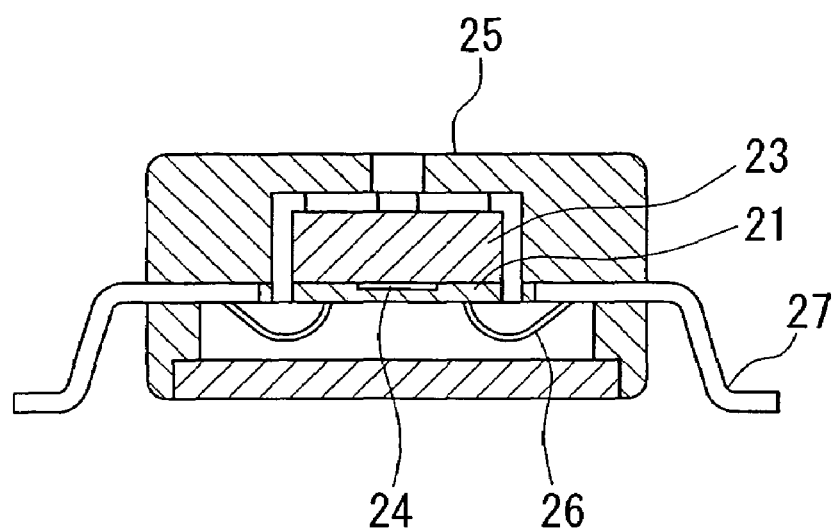
FIG. 11 is a sectional view showing an example of a conventional absolute pressure-type semiconductor pressure sensor.
Figure 12:
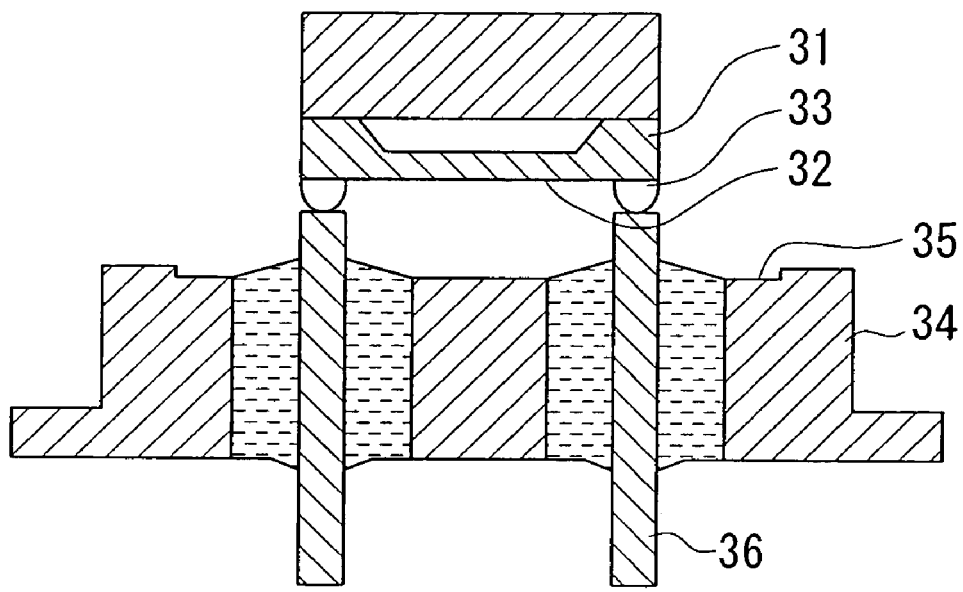
FIG. 12 is a sectional view showing an example of a conventional semiconductor pressure sensor having connecting bumps.
Figure 13:
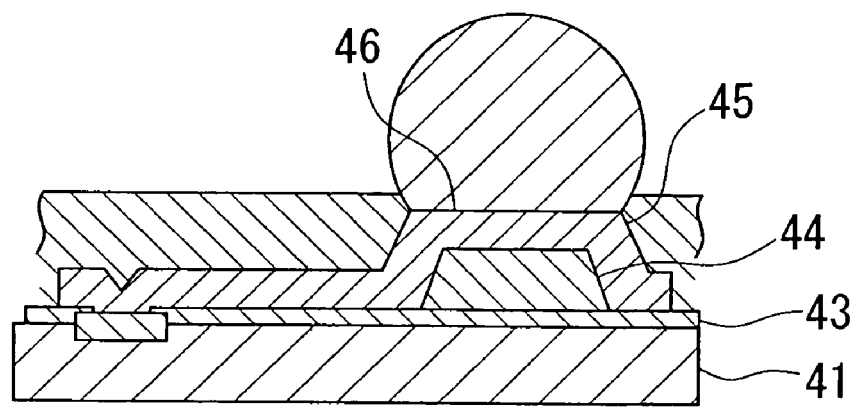
FIG. 13 is a sectional view showing an example of a conventional semiconductor package having a bump with a resin post.

In addition, FIG. 9 is a sectional view showing a structural example of another absolute pressure-type semiconductor pressure sensor according to the present invention. In this example, a part of a resinous projection 6 surrounded by an opening portion is connected to a surrounding insulating resin layer 10, and on a conductive layer 8 extended to an end portion (an upper portion of the resin layer 10 positioned at the side of a pressure-sensitive gauge electrode 5) of this resinous projection 6, a bump 9 is formed. In this case, since almost the entire part under the bump 9 is of the resin layer 10, the bump 9 is not easily influenced by stress that occurs as a result of a connection between the pressure-sensitive chip 1 and an electronic measuring device. In addition, it becomes possible to have the connecting position between the conductive layer 8 and bump 9 at a position where the resistance value of the piezoresistive pressure-sensitive gauge is not substantially influenced (for example, a position as far as possible from the piezoresistive gauge).

INDUSTRIAL APPLICABILITY

In a semiconductor pressure sensor according to the present invention, since the bumps to which an electronic measuring device is connected are formed so as to cover the resinous projections, an action of stress caused by a difference in thermal expansion between the pressure-sensitive chip and electronic measuring device can be dispersed and absorbed by deformation (deformation owing to compression, bending, a shearing force and the like) of the resinous projections. As a result, a connected condition of the bumps to the electronic measuring device can be stably maintained, and inconvenience such as increase in the resistance value owing to a change in the connected condition, electrode exfoliation, or extreme deformation of the bumps can be reliably prevented.

In addition, since an influence of stress caused by a connection via the bumps on the diaphragm, which is easily influenced by stress, can be eliminated, measurement accuracy of the semiconductor pressure sensor is improved. Furthermore, countermeasures such as newly providing a cushion member to absorb stress that occurs owing to a connection to the electronic measuring device become unnecessary. As a result, increase in the thickness of the pressure sensor owing to a connection between the pressure-sensitive chip and electronic measuring device is controlled, and it becomes possible to reduce the semiconductor pressure sensor in size and to lower cost.

In addition, in a manufacturing method for a semiconductor pressure sensor according to the present invention, since the resinous projections and surrounding insulating resin layer can be simultaneously formed by forming opening portions in the resin layer formed on the pressure-sensitive chip, shortening the forming time and lowering the cost by a reduction in the number of steps for forming these resinous projections and insulating resin layer become possible. As a result, it becomes possible to improve the semiconductor pressure sensor in manufacturing efficiency and lower cost.

The invention claimed is:

1. A semiconductor pressure sensor comprising a glass substrate adhered to a rear-surface side of a pressure-sensitive chip in which piezoresistive pressure-sensitive gauges have been formed on a front surface of a diaphragm formed of a silicon single crystal to form a first space between a rear surface of the diaphragm and the glass substrate, for measuring a pressure applied to the front surface of the diaphragm with reference to a pressure of the first space as a standard pressure, wherein there are provided resinous projections formed on pressure-sensitive gauge electrodes disposed on a front surface of the pressure-sensitive chip and bumps formed so as to partially or entirely cover these resinous projections, wherein the bumps are formed so as to cover a conductive layer which covers the resinous projections, and the pressure-sensitive chip is electrically connected to an electronic measuring device via the bumps and the conductive layer, wherein a front-surface side of the pressure-sensitive chip is covered with the electronic measuring device via the bumps, a difference in pressure on the diaphragm between a second space formed between the front surface of the diaphragm and electronic measuring device and the first space is measured as the to-be-measured pressure.

2. The semiconductor pressure sensor as set forth in claim 1, wherein the electronic measuring device is a circuit board on which the semiconductor pressure sensor is mounted.

3. A semiconductor pressure sensor comprising a glass substrate adhered to a rear-surface side of a pressure-sensitive chip in which piezoresistive pressure-sensitive gauges have been formed on a front surface of a diaphragm formed of a silicon single crystal to form a first space between a rear surface of the diaphragm and the glass substrate, for measuring a pressure applied to the first space with reference to a pressure applied to the front surface of the diaphragm as a standard pressure, wherein there are provided resinous projections formed on pressure-sensitive gauge electrodes disposed on a front surface of the pressure-sensitive chip and bumps formed so as to partially or entirely cover these resinous projections, wherein the bumps are formed so as to cover a conductive layer which covers the resinous projections, and the pressure-sensitive chip is electrically connected to an electronic measuring device via the bumps and the conductive layer, wherein a front-surface side of the pressure-sensitive chip is covered with the electronic measuring device via the bumps, a difference in pressure on the diaphragm between a second space formed between the front surface of the diaphragm and electronic measuring device and the first space is measured as the to-be-measured pressure.

\* \* \* \* \*